United States Patent [19]
Morrison

[11] Patent Number: 5,990,923
[45] Date of Patent: Nov. 23, 1999

[54] HIGH RESOLUTION DYNAMIC PULSE WIDTH MODULATION

[75] Inventor: Robert D. Morrison, Star, Id.

[73] Assignee: Hewlett-Packard Company, Palo Alto, Calif.

[21] Appl. No.: 08/970,816

[22] Filed: Nov. 14, 1997

[51] Int. Cl.$^6$ ........................................................ B41J 2/47
[52] U.S. Cl. .................... 347/252; 347/237; 347/247; 375/238; 375/239; 375/375
[58] Field of Search ................................ 347/252, 237, 347/247; 358/474; 375/238, 239, 373, 374, 375, 376

[56] References Cited

U.S. PATENT DOCUMENTS

| | | | |
|---|---|---|---|
| 4,847,641 | 7/1989 | Tung | 347/131 |
| 5,034,967 | 7/1991 | Cox et al. | 375/373 |
| 5,115,328 | 5/1992 | Kadono | 358/474 |
| 5,245,637 | 9/1993 | Gersbach et al. | 375/374 |
| 5,438,353 | 8/1995 | Morrison | 347/250 |

*Primary Examiner*—John Barlow
*Assistant Examiner*—Hai C. Pham

[57] ABSTRACT

Pulse width modulation of signals, such as provided to a driver in a laser printer, is phase locked to a beam detect signal. In addition, it must permit continuously variable, arbitrarily small pulses at extremely high speeds. This invention describes a novel method and system using multiple streams of variable phase clocked outputs. The variable phase clocked outputs are combined with a clock generator to achieve these goals at low cost. As a result, the pulse width modulated signals provide continuously variable selectable pulse widths at extremely high speed.

12 Claims, 2 Drawing Sheets

HIGH RESOLUTION DYNAMIC PULSE WIDTH MODULATION

FIELD OF THE INVENTION

This invention relates to an electrophotographic image forming apparatus, such as used on laser printers. More particularly, the invention relates to more accurately controlling the phase locked pulse width modulation of a scan beam of optical or other energy in order to enhance the quality of an image formed on such electrophotographic equipment.

BACKGROUND OF THE INVENTION

In electrophotographic printing, a pattern of electrostatic charges corresponding to a print image is developed on an optical photoreceptor (OPR). Toner is applied to the OPR and that toner which is retained as a result of not being repelled by electrostatic charges is used to form the print image. The print image is then transferred to a print media (usually paper).

The OPR may work with either visible spectrum light or optical energy outside the visible light spectrum. In the preferred embodiment, it is anticipated that near infrared laser light will be used, but the OPR as described in connection with this invention is intended to mean any photoreceptor which responds to radiated energy.

A laser printer creates a printed image by causing a laser light source, such as a laser diode, to scan across the charged surface of photosensitive material on an optical photoreceptor (OPR) in a succession of scan lines. Each scan line is divided into pixel areas and the laser beam is modulated such that selected pixel areas are exposed to light. The exposure to light results in the depletion of surface charges. The exposure of the OPR to the light thereby discharges the OPR at that location and results in the OPR developing toner and then transferring the toner to a corresponding location on the print media (usually a sheet of paper).

It is not practical to modulate the power of the laser other than to turn it on and off. There are too many environmental factors that are difficult to control that make operation of the diode in a non-saturated mode impractical. We can accomplish the same effect however by turning the laser (full) on and off for periods of time shorter than the actual pixel size. This is a standard application of a pulse-width modulated signal. In addition, there are times (to prevent jagged edges in a diagonal line, for example) when we wish to skew the pixel portion to the right or left, as well as change its effective intensity. It is therefore desired to provide an laser printer which allows the laser to be turned on and off in a precisely controlled manner. It is also desired to provide a design that permits this type of modulation that is phase locked to the scanning of the laser beam; otherwise successive lines will not line up accurately.

At locations where the OPR charge is depleted (by the laser light), toner particles from the emulsion are concentrated, thereby creating the image. At locations on the OPR which are charged, toner particles are not retained by the OPR (the non-image area). This makes the laser printer particularly adaptable to a rasterized print pattern, although it is possible to configure a laser printer for other types of scan techniques.

Printer resolution is partially a function of the size of the optical image which is generated by the laser or optics. The present invention is directed to enhancements of the optical image.

Hewlett-Packard Company, the assignee of this patent, has developed a technique for enhancing images for hardcopy devices which produce pixelated images. The technique includes matching a bit map of an image to be printed with predetermined stored templates or patterns to detect occurrence of preselected bit map features. When a match occurs, a compensated pattern is generated, which results in print enhancement. This technique is described in U.S. Pat. No. 4,847,641, to Charles Chen-Yuan Tung, and commonly assigned. One result of the technique is an ability to change the size of pixels along the edges of diagonal lines in order to reduce the jagged edges of these lines. In present printer configurations, more sophisticated algorithms are used to improve resolution.

Laser printers print pages by applying black toner to selected small regions of fixed size called pixels. It is possible to create the effect of shades of gray by placing toner in only a portion of the pixel region. This can be done by using pulse width modulation (PWM). It is not sufficient just to provide pulse width modulation of the pixel. It is also necessary to lock the phase of the pixels with the start of the laser scan; a single pulse synchronization signal from the laser scanner called "beam detect" provides the scan phase information.

There are several ways to vary the optical energy levels within a pixel. One common technique, pulse width modulation (PWM), is to simply vary the time duration of the energy applied to the optical element (the laser) within the pixel scan time. In this manner, the energy level is established by the time that the laser is turned on, rather than the power output of the laser.

A phase locked loop as known in the prior art cannot be used because in a laser printer there is no feedback or error signal that can correct frequency phase drift. The beam detect signal provides a single edge on each scan, so is of such low frequency that it cannot be used to establish a phase lock loop. The clock generator described in U.S. Pat. No. 5,438,353, commonly assigned, provides a description of the phase locking which may be used for this invention. The clock generator generates a clock signal that is exactly phase aligned to the beam detect signal transition, within the limits of a quantizing effect due to an internal delay chain. It does this alignment once, and does not change the phase again until the next beam detect signal occurs. The beam detect signal is generated by the printer engine as the laser begins a scan, which necessarily occurs once per line.

The aforementioned U.S. Pat. No. 5,438,353 describes controlling the timing of a modulation input signal utilized for driving a laser driver circuit. The present invention is an improvement on the capability of the clock generator describe in U.S. Pat. No. 5,438,353. It is no longer considered sufficient to print a pixel "ON" or "OFF." It is considered desirable to be able to provide continuously variable pixel outputs.

Laser printers are distinguished from other printers by their ability to place precise amounts of toner into very small regions of the page at relatively high speed, thus resulting in image quality far greater than most other types of printers. Since laser printers operate by scanning a drum or other optical photoreceptor that holds the printed image, this results in an intrinsic quantization of the image in the vertical direction of the page as the page passes the optical photoreceptor. In addition, limitations in the circuitry that modulates the horizontal scanning also quantizes the image, so that a single cell or pixel is effectively formed. If pixels are made small enough, the quantization effects can be made too small to see. There are, however, practical limits; the vertical quantization is limited by the ability to transfer data in serial form to the scanning laser.

Laser printer resolution is currently sufficient that the quantization is not normally visible, even at the pixel level. There are several indirect effects of quantization that produce interference effects that are generally called artifacts. Such flaws are readily apparent when the laser printer is used to reproduce photographic images. This is because of the extensive use of halftones in photographic image reproduction. Artifacts often appear as a printer attempts to print continuously varying halftones shades with quantized regions of pigmented and nonpigmented areas. By mixing regions of black and white (in the case of black pigment), and yet keeping the regions extremely small it is possible to provide an image which appears to the eye as a continuous range of gray. If the laser output can be modulated into very small regions of charged and uncharged areas, smaller than the quantized pixel elements, it is possible to reduce artifacts in printed photographs.

This problem has been addressed by providing several clocks with varying phase. In one such approach, the clock phases are locked the laser scanning via a beam detect signal, indicating the start of a scan line. It is possible to thereby provide precise pulse width modulation of up to $1/8$ pixel, even at very high horizontal pixel rates. Advances in printer engine technology and speed as well as the desire to print high quality photographic images require even finer pulse width modulation steps.

A prior art technique uses a capacitor with a current source and a voltage comparator. A change in voltage resulting from the current applied to the capacitor is supplied to the voltage comparator, so that the circuit will trigger on and off at controlled times. This system has potential drawbacks in that the re-initialization time limits the maximum operating frequency and the circuit presents linearity problems at either end of a pulse width modulation range (0% and 100%). It also has problems with stability over temperature and voltage and die lot (component) variation. A very significant problem is that this technique is limited in frequency. It is expected that printers will continue to increase in scan and print speeds, and for that reason, the capacitor method is not advantageous.

SUMMARY OF THE INVENTION

According to the present invention, it is possible to provide a clock generator where it is possible to provide any PWM edge desired at any time during the printed line, constrained only by the size of an individual delay element within the module delay chain which can be made arbitrarily small.

The invention provides a method to allow continuously variable pulse width modulation (PWM) of a pixel, unlike prior techniques which restricted PWM steps, for example, to $1/8$ pixel size. This therefore provides a method to more precisely control the modulation of the laser. The invention includes a single phase clock generator and PWM circuitry to provide an effective solution to the problem of the need to enhance resolution at low cost. The inventive circuit could easily be incorporated into an application specific integrated circuit (ASIC) used to control the printer's laser. Additionally the technique can be implemented with significantly higher pixel frequencies than other methods, allowing for its use in the fastest laser printers available.

In adjusting the signal normally received from the clock generator, the invention contemplates dynamically switching between multiply delayed versions of the data. The data can be preprocessed so that streams of data with known stable points can be generated. The stable points allow time for phase shifting selection. A multiplexer provides for the selection and, once multiplexed, it is possible to recombine all streams to regenerate the expected laser output signal.

The inventive system permits control of laser pulse duration for periods of time shorter than pixel size. This control makes it possible to skew the pixel portion to the right or left, as well as change its effective intensity. This invention provides this function in a phase locked environment of the type used in laser printers.

The pulse width modulation is dynamically changed by enabling different portions of the stream at different times, thus allowing varying width or position of the pulse. It is therefore possible to make these adjustments while maintain an amplitude for driving the laser which is always either 0 or 1.

A preferred embodiment provides multiple data streams, each encoded so that there is a quiescent time. At this quiescent time, all delayed tap versions are stable, so a multiplexer can safely select any tap without generating an unexpected glitch. The quiescent time is a signal idle time, and therefore, in terms of a data stream, a stream inactive time. The use of the quiescent time allows the adjustment of the modulation in each of the data streams to be achieved in a metastable-safe manner.

One embodiment provides four data streams, each encoded so that there is a three cycle quiescent time. At this quiescent time, all delayed tap versions are stable, so a multiplexer can safely select any tap without generating an unexpected glitch. The quiescent time is a signal idle time, and therefore, in terms of a data stream, a stream inactive time. The use of the quiescent time allows the adjustment of the modulation in each of the data streams to be achieved in a metastable-safe manner.

The incoming data is converted to differentiated form, such as an edge detect, and then separated into the four streams using AND gates and EX-OR gates. Each stream then is provided to a chain of flip-flops that are clocked by successively delayed clock inputs. The flip-flop outputs then go the multiplexer, which performs the switching of the flip-flop outputs during the quiescent period. The outputs of the multiplexers are all EX-ORed together to recover the original signal.

The delayed taps provide a tap count, and are provided in small enough increments such that incremental adjustment is sufficient to provide the desired resolution. The incremental adjustment can be referred to as infinite adjustment in that the adjustment increments are small enough to exceed an ability to precisely control the remainder of the optical development process. This tap count is then used to pick a precise duration of the signal provided to control a laser driver circuit. The delayed taps are clocked into a register, whereupon they can be counted with another circuit. This establishes a clock measuring chain that continuously establishes the delay time of each tap. This allows the circuit design to be independent of temperature, voltage or die lot (component) variations.

One of the data streams is an active data stream. In the active stream, data for the active (non-quiescent) cycle is accompanied by the computed tap selection number, which is used by the multiplexer to safely select the desired phase that the data is to transition on. All streams are then recombined by being EX-ORed together to recover the original signal. The resulting output now has pulse width modulation capability to the limit of the delay chain quantization size. In the preferred embodiment, this is at approximately 500 pS (picoseconds), worst case, and typically about half of this, or 250 pS. This modulation is about 35 to 70 times the modulation which would be available without this invention, and is achieved without a significant increase in cost or formatter complexity.

DETAILED DESCRIPTION OF THE INVENTION

Figure 1:
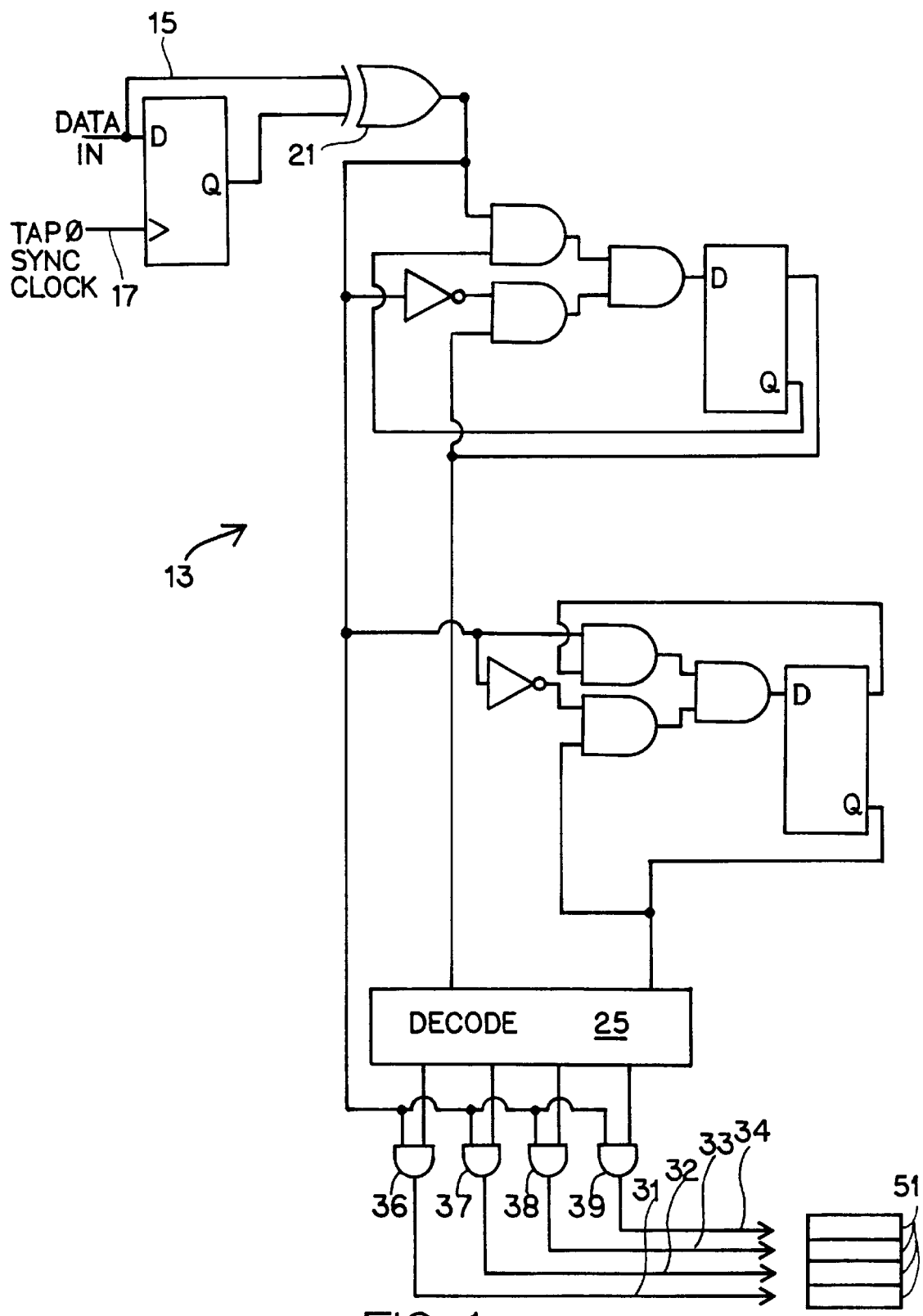
FIG. 1 shows a data encoder used with the present invention.

FIG. 1 shows a preferred embodiment of the data encoder 13. Input data 15 and a clock signal 17 are used to provide data to an EX-OR gate 21 to provide a differentiated output of the input data. The data is then decoded at decoder 25 and supplied to each of four data streams 31–34, provided through AND gates 36–39. The decoder uses image intensity information from input data to select which of the four data streams 31–34 to supply with the data. The four data streams are supplied to each of four phase modulation circuits 51. Each phase modulation circuit 51 modifies the phase of a signal at its output.

In the circuit of FIG. 1, the original data never actually is passed through to the output of the decoder 25, but instead is used to control whether a corresponding data stream transition is permitted. The four data streams thus are an indirect encoded copy of the incoming data that can be extracted by EX-ORing them together, as will be seen.

Figure 2:
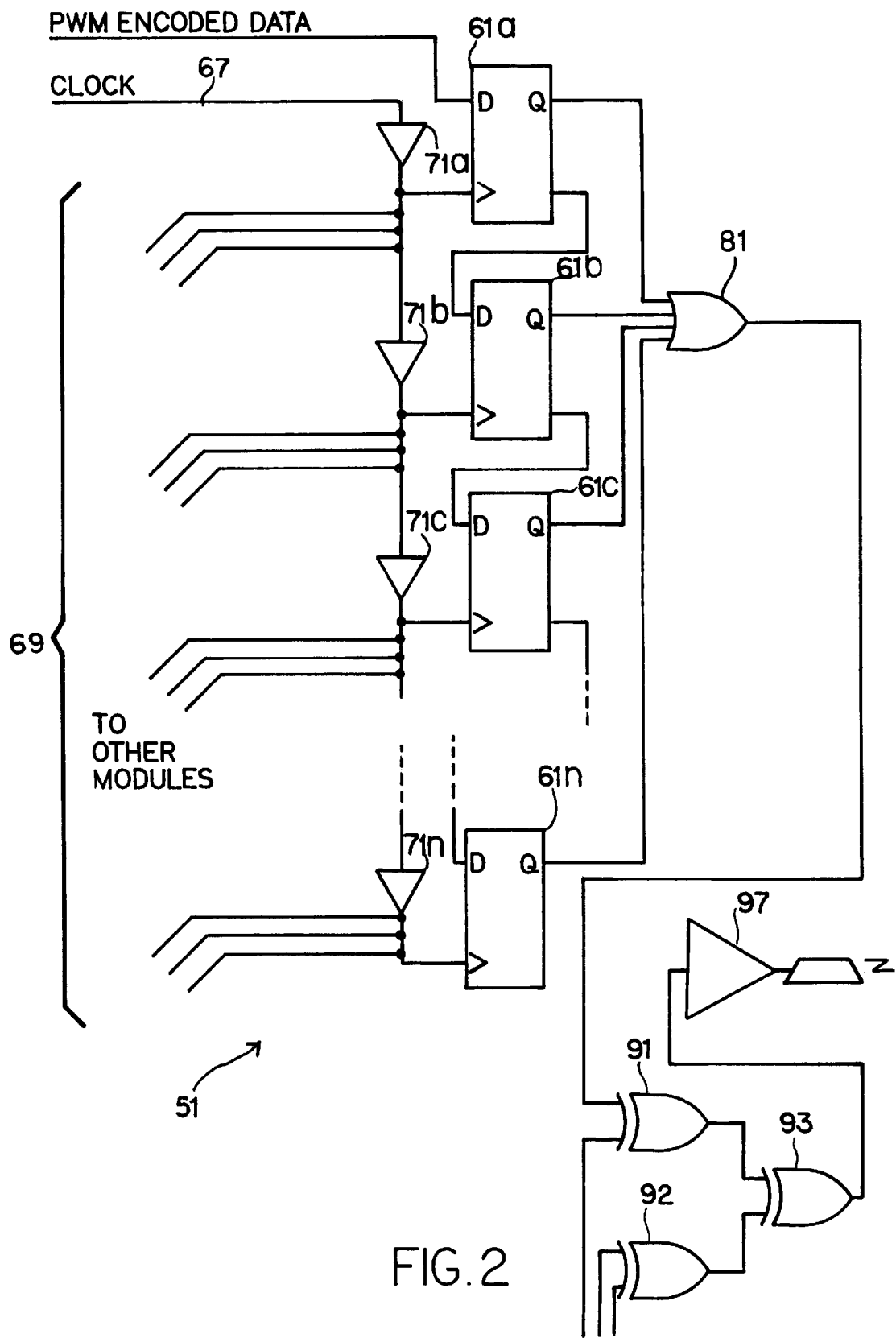
FIG. 2 shows a phase modulation circuit constructed according to a preferred embodiment of the invention.

FIG. 2 shows a pulse width modulation circuit 51. The encoded data is selectively supplied to a plurality of D-type flip-flops 61a–61n. The D-type flip-flops 61 are timed by timing signals from a clock 67, whose signal is transmitted through a clock delay chain 69. In the preferred embodiment, the clock delay chain consists of a plurality of pairs of inverted buffers 71a–71n, although other convenient delay elements may be used.

The delay chain 69 provides timing signals supplied from the data encoder 13 to successive ones of the D-type flip-flops 61a–61n so that data from the successive flip-flops 61 are incrementally delayed. The outputs of the D-type flip-flops 61 are supplied to OR gate 81, and thence to EX-OR gates 91–93. The EX-OR gates 91–93 provide a single stream of data to a laser driver 97.

The delayed taps provide a tap count. In the preferred embodiment, a number of taps is chosen so that a total delay time can be chosen based on a minimum delay time for the clock delay chain 69, which is generally at high operating temperatures and low operating voltage. The delayed taps can be clocked into a register and held, whereupon they can be counted with another circuit. This establishes a clock measuring chain. By selecting the particular D-type flip-flops, 61a–61n, very small increments in pulse width adjustments are possible.

The outputs of the four data streams 31–34 from AND gates 36–39 (FIG. 1) are supplied to separate phase modulation circuits which are identical to phase modulation circuit 51 and share the common delay chain 69. The outputs of the separate phase modulation circuits are provided to EX-OR gates 91–93, and so a combined output of data is provided which defaults to a single data stream. In this manner, there is a three cycle quiescent time for each of the four data streams.

It should be noted that the control of the flip-flops 61 makes the three cycle quiescent time desirable, but it is possible to implement the invention with a different number of data streams. The multiple data streams are used to permit adjustment of timing while permitting sequential control of the laser driver 97 without substantial interruption. By using the multiple data streams, it is possible to assure that all delayed tap versions are stable, so a multiplexer can safely select any tap without generating an unexpected glitch.

If the decoder selects a particular one of the modulation circuits 51, then data will be present at the EX-OR gates 91–93 from that particular modulation circuit 51 and that data will be the data presented to the laser driver 97.

Modulation circuits 51 share the same delay chain 69. Therefore each modulation circuit 51 will present a similar modulation characteristic, permitting the modulation circuits 51 to function identically for sequential pixels without delay. By using the EX-OR gates 91–93, it is possible to reconstruct the modulation characteristic in a desired manner, regardless of which modulation circuit 51 is enabled. A corresponding single output signal is presented to the laser driver 97.

The connection of the sequential D-type flip-flops 61 to the data encoder 13 permits the use calculation logic to generate D controls for each flip-flop in the chain. Since such calculation logic provides direct control, it may be possible to reduce the number of modules 51. Alternatively, it is possible to connect the flip-flops 61 so that sequential ones of the flip-flops 61b–61n are controlled by preceding flip-flops in the chain 61a–61(n–1). This effectively accomplishes the same result as shown by the arrangement of FIG. 2, since the sequential flip-flops obtain their timing signals from the inverted buffers 71. There are therefore several methods for generating data for each stream.

The invention has been described in terms of the preferred embodiment of a laser printer. It is also possible to use the inventive techniques on other electronic equipment which provide pixelated images. An example of such equipment would be a wide angle CRTs, in which it is desired to control a scan pattern so as to provide control of imaging intensity while synchronized to the scan rate of a CRT. While particularly useful for laser printers, the inventive techniques can be used with scan patterns other than laser printers, and for other types of printers. In particular, the invention is useful for laser printers which are capable of developing halftone images by controlling or reducing development for individual pixels. It is therefore anticipated that the invention should be limited in scope only by the claims.

What is claimed is:

1. A circuit for providing continuously varying phase locked pulse width modulation of a multiple pulse signal in response to a single pulse synchronization signal, the circuit comprising:

a. a reference signal;

b. an image generator circuit for pixelating an image by resolving the image into a pattern of pixels for development and providing an output signal corresponding to the pattern of pixels;

c. a plurality of phase modulation circuits synchronous to the reference signal and receiving said output signal from the image generator circuit, each of the phase modulation circuits including a plurality of logic circuits connected sequentially, each of said logic circuits responding in sequential delayed timing steps, the delayed timing steps corresponding in sequence to a connection sequence of the logic circuits;

d. a data output selection circuit for sequencing one of a plurality of data streams supplied to said phase modulation circuits, each of said data streams supplied to a respective one of said phase modulation circuits; and e. a data circuit receiving a signal from the drive output selection circuit and driving an image scan device in a scan pattern, the scan pattern corresponding to the pattern of pixels.

2. The circuit of claim 1, further comprising:

a. the data output selection circuit including a circuit supplying the phase modulation circuits with said output signal; and b. a circuit for limiting data from said plurality of data streams supplied to the drive circuit to a single composite image.

3. The circuit of claim 2, further comprising:

the circuit for limiting image data supplied to the drive circuit to a single composite image including a plurality of EX-OR gates, the EX-OR gates limiting data to a single phase modulation circuit, thereby permitting adjustment of the phase modulation circuits in a metastable-safe manner.

4. The circuit of claim 1, further comprising:

a clock signal delay chain providing a plurality of clocking signals in said plurality of delayed timing steps to the phase modulation circuits, said plurality of clocking signals anticipating a maximum timing length for driving the image scan device for a pixel in a predetermined worst case based on an anticipated minimum delay time for each delayed timing step.

5. The circuit of claim 1, further comprising:

a. a clock generator circuit providing a plurality of clocking signals to the drive circuit corresponding to said plurality of delayed timing steps;

b. the phase modulation circuits receiving the output signal from the image generator circuit and transmitting a plurality of clocked output signals corresponding to said plurality of clocking signals;

c. the data output selection circuit including a multiplexer, receiving said plurality of clocked output signals and providing data corresponding to desired time delays; and d. a circuit combining the data from the multiplexer into a single output signal to a driver circuit.

6. The circuit of claim 5, further comprising:

a. the clock generator circuit providing a delay chain; and b. said multiplexer and circuit combining the data providing the driver with a signal pulse width modulated to a limit of a delay chain quantization size of the delay chain.

7. The circuit of claim 5, further comprising:

the data output selection circuit providing said data streams to the phase modulation circuits to provide a quiescent time consisting of a plurality of cycles, and thereby permitting the selection to occur in a stable manner.

8. The circuit of claim 1, further comprising:

a. a clock generator circuit providing a plurality of clocking signals to the drive circuit corresponding to said plurality of delayed timing steps;

b. said logic circuits each including a D-type flip-flop connected sequentially, each of said flip-flops receiving signals from respective ones of the delayed timing steps, the delayed timing steps corresponding in sequence to a connection sequence of the flip-flops; and c. a combination of the flip-flops and the delayed timing steps providing a desired phase modulation range.

9. A continuously variable phase locked pulse width modulation circuit for increasing resolution of a modulated optical energy source, the circuit comprising:

a. an image generator circuit for pixelating an image by resolving the image into a pattern of pixels for development and providing an output signal corresponding to the pattern of pixels;

b. a multiplexer, receiving said output signal and providing a plurality of segregated data streams;

c. a clock generator circuit providing a plurality of clocking signals in a plurality of delayed steps;

d. a plurality of modulation circuits, corresponding to said plurality of segregated data streams, and the modulation circuits corresponding to each of said data streams modulating the data in the respective data streams with selected ones of the plurality of delayed steps;

e. a circuit combining the data from the modulation circuits into a single output signal; and f. a drive circuit for driving an image scan device in response to the single output signal in a scan pattern corresponding to the pattern of pixels.

10. The circuit of claim 9, further comprising:

a plurality of EX-OR gates, the EX-OR gates limiting data to a single modulation circuit, thereby permitting variation of a modulation characteristic of the signal presented to the drive circuit.

11. A method for providing a continuously variable phase locked pulse width modulated signal, in order to increase resolution of a modulated optical energy source, the method comprising:

a. receiving a pixelated image;

b. segregating the pixelated image into a plurality of data streams;

c. providing the pixelated image to a plurality of phase modulation circuits corresponding to said plurality of data streams by sequencing one of the plurality of data streams to said phase modulation circuits;

d. providing an incremental delay chain;

e. selectively modulating the data streams in each of said phase modulation circuits with time delays established by said incremental delay chain; and f. combining the modulated data in the plurality of data streams, thereby providing a substantially uninterrupted output of data of the sequenced data after modulation.

12. The method of claim 11 wherein the step of providing an incremental delay chain comprises:

a. providing the incremental delay chain in a plurality of delayed timing steps;

b. using a plurality of flip-flops connected sequentially to each other and providing timing signals corresponding to the plurality of delayed timing steps in the incremental delay chain; and c. using a combination of the flip-flops and the timing signals to provide a desired phase modulation range.

* * * * *